United States Patent
Lekutai (10) Patent No.: US 11,223,959 B2
(45) Date of Patent: *Jan. 11, 2022

(54) UNLICENSED ASSISTED ACCESS AGGREGATED BAND FOR IMPROVING DIRECT COMMUNICATION CHANNEL BANDWIDTH RELIABILITY IN A V2X COMMUNICATION

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/930,286

(22) Filed: May 12, 2020

(65) Prior Publication Data

US 2021/0360415 A1   Nov. 18, 2021

(51) Int. Cl.
*H04W 16/14* (2009.01)
*H04W 4/40* (2018.01)
*H04W 28/08* (2009.01)
*H04W 92/18* (2009.01)

(52) U.S. Cl.
CPC ............ *H04W 16/14* (2013.01); *H04W 4/40* (2018.02); *H04W 28/0983* (2020.05); *H04W 92/18* (2013.01)

(58) Field of Classification Search
CPC ... H04W 16/14; H04W 4/40; H04W 28/0983; H04W 92/18
See application file for complete search history.

(56) References Cited

U.S. PATENT DOCUMENTS

| | | |
|---|---|---|
| 6,999,471 B1 | 2/2006 | Frazer et al. |
| 8,913,544 B2 | 12/2014 | Akita et al. |
| 9,763,267 B2 | 9/2017 | Abraham et al. |

(Continued)

OTHER PUBLICATIONS

A. K. Ligo and J.M. Peha, Spectrum forV2XAllocation and Sharing, in IEEE Transactions on Cognitive Communications and Networking, vol. 5, No. 3, pp. 768-779, Sep. 2019.

(Continued)

*Primary Examiner* — Farid Seyedvosoghi
(74) *Attorney, Agent, or Firm* — Han Santos, PLLC (57) ABSTRACT

Techniques are described herein for using unlicensed assisted access aggregated band to improve direct communication channel bandwidth reliability in a vehicle-to-everything (V2X) communication. The techniques include a (wireless communication) device that uses a first licensed band to perform a cellular network communication through a first interface (e.g., Uu), and further uses a shared spectrum to perform the V2X communication through a direct communication channel interface. The device then monitors and compares a bandwidth requirement of the V2X communication with a bandwidth of the shared spectrum. In response to the bandwidth that is less than the bandwidth requirement, the device selects at least one second licensed band to be aggregated with the shared spectrum to generate the unlicensed assisted access aggregated band. In some embodiment, the device adjusts the first licensed based on the selected least one second licensed band to avoid channel interference.

20 Claims, 6 Drawing Sheets

(56) References Cited

U.S. PATENT DOCUMENTS

| | | |
|---|---|---|
| 10,165,574 B2 | 12/2018 | Baghel et al. |
| 10,349,442 B2 | 7/2019 | Baghel et al. |
| 10,383,114 B2 | 8/2019 | Jiang et al. |
| 10,477,371 B2 | 11/2019 | Gulati et al. |
| 10,548,184 B2 | 1/2020 | Obaidi |
| 10,575,083 B2 | 2/2020 | Perianu et al. |
| 10,580,291 B1 | 3/2020 | Rothenberg et al. |
| 10,757,711 B2 | 8/2020 | Lee et al. |
| 2003/0165200 A1 | 9/2003 | Pugel |
| 2004/0203815 A1 | 10/2004 | Shoemake et al. |
| 2006/0146775 A1 | 7/2006 | Song et al. |
| 2007/0064606 A1 | 3/2007 | Uh et al. |
| 2011/0228779 A1 | 9/2011 | Goergen |
| 2012/0063373 A1 | 3/2012 | Chincholi et al. |
| 2013/0203378 A1 | 8/2013 | Vos et al. |
| 2014/0162667 A1 | 6/2014 | Mueck |
| 2015/0111569 A1 | 4/2015 | Gupta |
| 2016/0234031 A1 | 8/2016 | Rabii et al. |
| 2016/0234032 A1 | 8/2016 | Rabii et al. |
| 2017/0111921 A1 | 4/2017 | Fan et al. |
| 2017/0272995 A1 | 9/2017 | Kim et al. |
| 2018/0255611 A1* | 9/2018 | Li .......................... H04W 76/10 |
| 2018/0351844 A1* | 12/2018 | Viox ...................... H04W 24/08 |
| 2020/0145293 A1 | 5/2020 | Terazawa et al. |
| 2020/0196325 A1* | 6/2020 | Patil ....................... H04W 4/12 |
| 2020/0245115 A1 | 7/2020 | Dorrance et al. |
| 2021/0089026 A1 | 3/2021 | Bender et al. |

OTHER PUBLICATIONS

U.S. Appl. No. 16/890,855, Office Action dated Jul. 20, 2021, 26 pages.
U.S. Appl. No. 15/930,278, Notice of Allowance dated Aug. 31, 2021, 40 pages.

* cited by examiner

| | LF Area 208 | MF Area 206 | HF Area 204 | Uu Licensed Band 302 | Licensed Band(s) 304 |
|---|---|---|---|---|---|
| 310 — Dev. 232<br>Dev. 242 | Yes 312<br>Yes 314 | No<br>No | No<br>No | LF (DL)<br>LF (DL) | LF(UL), MF, and/or HF 316 |
| 320 — Dev. 232<br>Dev. 242 | Yes 322<br>Yes | No<br>Yes 324 | No<br>No | LF (DL)<br>LF/MF (DL) | LF(UL), MF(UL), and/or HF 326 |
| 330 — Dev. 232<br>Dev. 242 | Yes<br>Yes 332 | Yes 334<br>No | No<br>No | LF/MF (DL)<br>LF (DL) | LF(UL), MF(UL), and/or HF 336 |
| 340 — Dev. 232<br>Dev. 242 | Yes<br>Yes | Yes 342<br>Yes 344 | No<br>No | LF/MF (DL)<br>LF/MF (DL) | LF(UL), MF(UL), and/or HF 346 |
| 350 — Dev. 232<br>Dev. 242 | Yes<br>Yes | Yes 352<br>Yes | No<br>Yes 354 | LF/MF (DL)<br>LF/MF/HF (DL) | LF(UL), MF(UL), and/or HF(UL) 356 |
| 360 — Dev. 232<br>Dev. 242 | Yes<br>Yes | Yes<br>Yes 362 | Yes 364<br>No | LF/MF/HF (DL)<br>LF/MF (DL) | LF(UL), MF(UL), and/or HF(UL) 366 |
| 370 — Dev. 232<br>Dev. 242 | Yes<br>Yes | Yes<br>Yes | Yes 372<br>Yes 374 | LF/MF/HF (DL)<br>LF/MF/HF (DL) | LF(UL), MF(UL), and/or HF(UL) 376 |
| 380 — Dev. 232<br>Dev. 242 | Yes 382<br>Yes | No<br>Yes | No<br>Yes 384 | LF<br>LF/MF/HF | No V2X Comm. 386 |
| 390 — Dev. 232<br>Dev. 242 | Yes<br>Yes 392 | Yes<br>No | Yes 394<br>No | LF/MF/HF<br>LF | No V2X Comm. 396 |

UNLICENSED ASSISTED ACCESS AGGREGATED BAND FOR IMPROVING DIRECT COMMUNICATION CHANNEL BANDWIDTH RELIABILITY IN A V2X COMMUNICATION

BACKGROUND

Vehicle communication systems may include vehicle-to-everything (V2X) communication software or programs that can facilitate transmission of information from a vehicle to any entity that may affect the vehicle and vice versa. V2X communication software generally resides at least partially in a memory unit of a vehicle's native computing system such as a vehicle's electronic control unit (ECU) and enables the vehicle to act as a communication node when communicating with various entities. For example, vehicles can communicate with other vehicles, infrastructures (e.g., traffic lights), passengers and/or pedestrians with mobile devices, networks, and/or so forth. Thus, V2X communication can include components such as vehicle-to-vehicle (V2V), vehicle-to-infrastructure (V2I), vehicle-to-pedestrian (V2P), and vehicle-to-network (V2N) communications.

A vehicle's native computing system may operate to support one or more V2X communication components. For example, the vehicle's ECU (or device) may perform V2V and V2P communications at the same time. In another example, the device may implement the V2V communication that includes autonomous driving and/or platooning with another vehicle. In these examples, the V2X communication may require specific capabilities or features to be successful, such as minimum requirements regarding reliability, latency, and the like. The reliability and latency requirements may in turn require use of wireless communication interfaces that can support higher channel bandwidth, reduced channel interference, etc.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for using an unlicensed assisted access aggregated band to improve bandwidth reliability in a direct communication channel that facilitates V2X communications between wireless communication devices. A general purpose for the V2X communication is to enable vehicles (with corresponding embedded wireless communication devices) to transmit and/or receive voice, data, and other types of content. To support higher consumption of voice, data, and other types of content, the embedded wireless communication device may increase bandwidth of the direct communication channel to achieve higher data throughput. In example embodiments, the embedded wireless communication device increases the bandwidth of the direct communication channel by initially using a default shared spectrum in the direct communication channel and then aggregating one or more selected licensed bands of a vehicle's wireless telecommunications network service provider (WTNSP) or Mobile Network Operator (MNO) with the default shared spectrum. The default shared spectrum may include an unlicensed band that can be used by the wireless communication as an anchor band to establish the V2X communication. The aggregation of the selected one or more licensed bands with the anchor band may generate the unlicensed assisted access aggregated band that provides the increased bandwidth in the direct communication channel. The generated unlicensed assisted access aggregated band is a product of one-way aggregation such as, the aggregation between one licensed band and the anchor band, a product of multi-way aggregation such as, the aggregation between a first licensed band, a second licensed band, and the anchor band.

In some embodiments, the wireless communication device uses the unlicensed assisted access aggregated band as a reference for selecting a different licensed band that can be used by the wireless communication device over a network interface. The selection of the different licensed band for the network interface may avoid channel overlapping or channel interference over the use of the unlicensed assisted access aggregated band in the direct communication channel. In this embodiment, the wireless communication device may exercise greater control in the selection of the licensed bands for the direct communication channel and adjustment (when necessary) of the licensed band over the network interface.

V2X communication may encompass two separate interfaces. V2X communication may use a first interface such as, for example, a Long Term Evolution interface (Uu) for cellular network communications with the WTNSP or MNO. V2X communication may also use a second interface such as, for example, an LTE V2X or new radio (NR) V2X interface (PC5 interface) for direct channel communications. In example embodiments, V2X communication utilizes both interfaces at the same time. For example, V2N communication may use a vehicle's cellular network connection in a traditional manner over the Uu, which can serve as a logical interface between the vehicle and a base station of the WTNSP or MNO. At the same time, the vehicle may perform V2P communication through the PC5 interface. In this example, the V2N communication over the Uu may be implemented independently of the V2P communication over the PC5 interface.

In an example embodiment, a wireless communication device is integrated into a vehicle's platform as an electronic control unit (ECU) or as a portable computing system. In this embodiment, the wireless communication device is associated with a particular vehicle that performs, for example, V2X communication with another vehicle. In this example, the other vehicle may also include a separate wireless communication device that is integrated to its platform. The wireless communication device may include hardware circuit components that can process data, perform transmission and reception of data through cellular network connections and/or direct communication channels, detect device location, and the like. Further, the wireless communication device may be configured to be a subscriber of one or more WTNSPs or MNOs. The subscription may be preconfigured during vehicle manufacture and can be adjusted from time to time such as, for example, when the wireless communication device changes MNO or WTNSP and/or add network subscription features.

In an example embodiment, a first vehicle that is equipped with a first wireless communication device initially contends for access of the default shared spectrum in the direct communication channel (e.g., via a PC5 interface) to establish V2X communication with a second vehicle that is similarly equipped with a second wireless communication device. The first wireless communication device may use a contention-based protocol (CBP) such as the Listen Before Talk (LBT) procedure to access the shared spectrum, which is also available for use by other wireless communication devices and/or UEs in an equally shared or in a prioritized manner. With the established V2X communication, the first wireless communication device may compare a bandwidth that can be supported by the use of the shared spectrum with bandwidth requirements of the established V2X communication. In a case where the bandwidth of the shared spectrum is less than the bandwidth requirements, the first wireless communication device may select from a look-up table (LUT) one or more licensed bands from a radio spectrum that is licensed to a first wireless communication device's MNO or WTNSP. The selected one or more licenses bands may be aggregated with the shared spectrum to generate the unlicensed assisted access aggregated band. The unlicensed assisted access aggregated band may support different channel bandwidth sizes (e.g., 20 MHz, 50 MHz, 100 MHz) that can be used in the direct communication channel to increase the bandwidth of the direct communication channel.

For example, the first wireless communication device uses the LBT or other CBP procedure to access the 5.9 GHz unlicensed anchor band for establishing V2V, V2I, and V2P communications with the second wireless communication device, traffic light, and a passenger's user equipment (UE), respectively. With the established V2V, V2I, and V2P communications, the first wireless communication device may monitor the bandwidth requirements of the V2X communication components relative to the bandwidth that can be supported by the 5.9 GHz unlicensed anchor band. In a case where the bandwidth is less than the bandwidth requirements, the first wireless communication device may select, for example, a high frequency licensed band of the radio spectrum that is licensed to the first wireless communication device's MNO or WTNSP. The selected high frequency licensed band may be aggregated with the 5.9 GHz unlicensed band to increase the bandwidth of the direct communication channel.

In some embodiments, the selection of the licensed band(s) from the radio spectrum includes the selection of an uplink (UL) and/or downlink (DL) channel of the licensed band. That is, the UL channel of the licensed band may be selected independently of the licensed band's DL channel. In a case where the UL channel of the licensed band is selected for aggregation with the anchor band, then the DL channel of the same licensed band may be used over the Uu. Similarly, when the DL channel of the licensed band is selected for aggregation, then the UL channel can be used over the Uu. In these cases, the use of the selected licensed band in the direct communication channel may not overlap with the use of the same licensed band over the network interface (Uu). Thus, the licensed band in the direct communication channel may not create channel interference over the use of the same licensed band in the Uu.

The techniques described herein may be implemented in a number of ways. Example implementations are provided below with reference to the following figures.

Example Network Architecture

Figure 1:
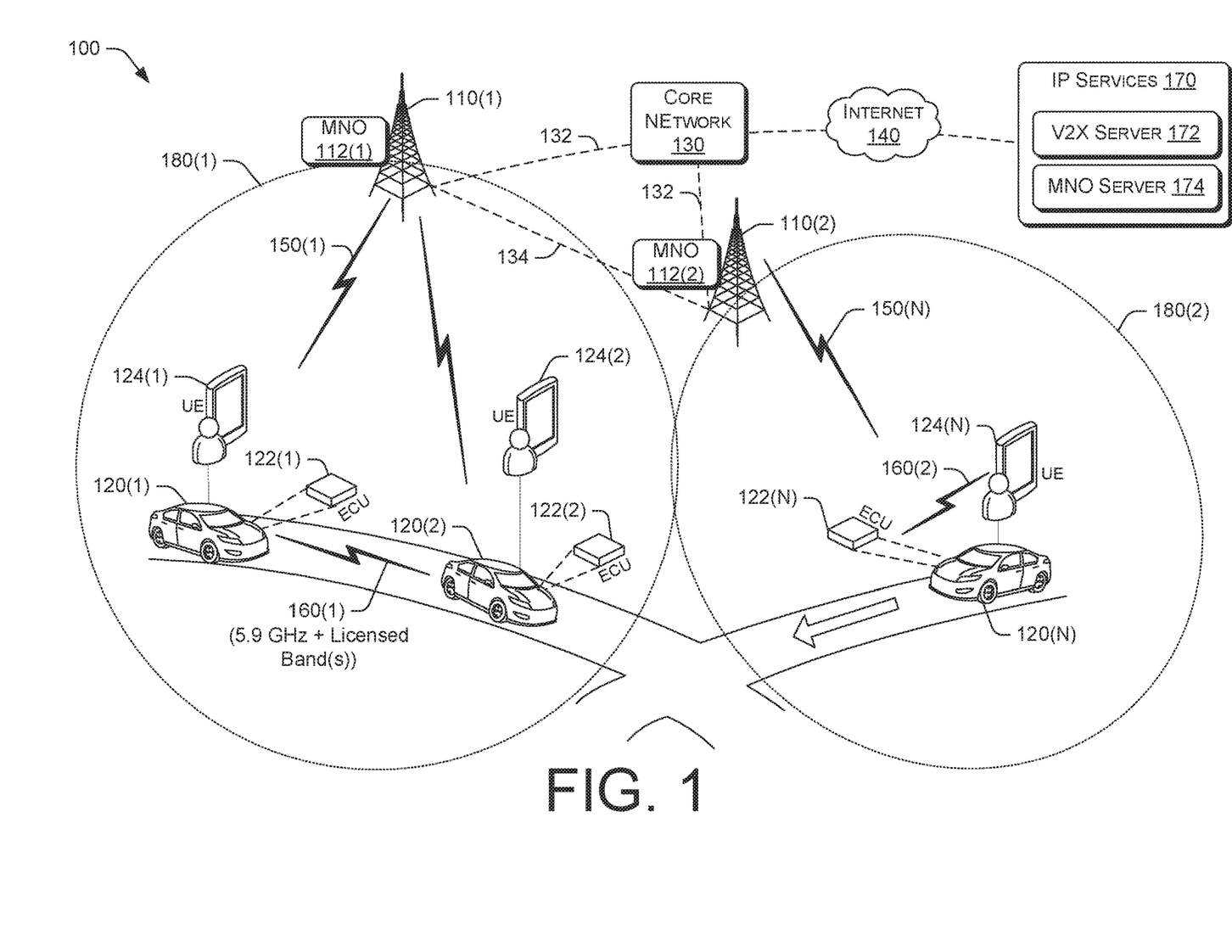
FIG. 1 illustrates an example of a network architecture that facilitates wireless communications between vehicles equipped with wireless communication devices for V2X communications.

FIG. 1 illustrates an example architecture of a wireless communications system such as an evolved packet system 100. The evolved packet system 100 may include base stations 110 that can be associated with MNO 112, vehicles 120 with integrated wireless communication devices 122, (passenger) UEs 124, a core network 130, internet 140, and Internet Protocol (IP) services 170 including a V2X communication server 172 and MNO service server 174. Each of the devices 122 and/or UEs 124 may connect to the base station 110 through a radio interface 150. Each of the devices 122 and/or UEs 124 may establish and/or perform V2X communications through a direct communication channel interface 160 such as the PC5 interface. Further, each of base stations 110 may provide cellular wireless communications within respective geographic coverage area 180. In an example embodiment, the devices 120 implement the use of the unlicensed assisted access aggregated band to increase bandwidth in the direct communication channel for the V2X communication.

Base stations 110 in the evolved packet system 100 may be collectively referred to as Evolved Universal Mobile Telecommunications System (UMTS) Terrestrial Radio Access Network (E-UTRAN) that can be connected to the core network 130 through backhaul links 132 (e.g., S1 interface). Base stations 110 may perform transfer of user data, mobility control functions such as handover and dual connectivity, inter-cell interference coordination, connection setup and release, load balancing, distribution for non-access stratum (NAS) messages to the UEs 124, NAS node selection, paging, positioning, delivery of warning messages, detecting locations of devices 122 and/or UEs 124, and the like. Further, base stations 110 may communicate directly or indirectly with each other over a backhaul link 134 (e.g., X2 interface). The backhaul link 134 may be wired or wireless.

Base station 110 may be deployed in a network cell to cover, for example, the geographic coverage area 180. Base station 110 may use different licensed bands, a particular amount of transmitting power, a specific antenna configuration, and the like, to cover the geographic coverage area 180. The licensed bands may be taken from a radio spectrum that is licensed to the MNO 112, which can be associated with the base station 110. In an embodiment, the base station 110 is configured to support in parallel the use of the licensed band in the radio interface 150 and the use of a different licensed band such as the unlicensed assisted access aggregated band in the direct communication channel interface 160. In this embodiment, the use of the different licensed band in the direct communication channel interface 160 does not interfere with the use of the licensed band in the radio interface 150.

MNO 112 may include a provider of wireless communications services to an end user including radio spectrum allocation, wireless network infrastructure, and the like. MNO 112 may own/control access to the radio spectrum license, and control elements of the wireless network infrastructure that are necessary to provide the wireless communications services to subscribers (e.g., device/UE subscribers). In an example embodiment, the MNO 112 allows the licensed band of its radio spectrum to be aggregated with the shared spectrum in order to generate the unlicensed assisted access aggregated band. In this embodiment, the UE/device subscriber uses the unlicensed assisted access aggregated band in the direct communication channel interface 160 to increase the bandwidth of the direct communication channel as described herein.

Radio interface 150 may facilitate cellular network communications between the base station 110 and the devices 122 and/or UEs 124. The radio interface 150 may serve as a communication link between the base station 110 and the devices 122/UEs 124. Radio interface 150 may include UL transmissions from the device 122/UE 124 to the base station 110 and/or DL transmissions from the base station 110 to the device 122/UE 124. Further, the radio interface 150 may use one or more licensed bands of the associated MNO 112. For example, the base station 110 is associated with the MNO 112 that owns a radio spectrum license including 28 GHz/39 GHz high band, 2.5 GHz/3.5 GHz mid band, or 600 MHz/700 MHz low band. In this example, the base station 110 may use the different licensed bands in radio interface 150 during the UL and/or DL transmissions between the base station 110 and the devices 122/UEs 124.

Device 122 may include a wireless communication electronic device that can be installed and/or integrated into a vehicle's computing system or platform. Device 122 may include hardware circuit components that can establish V2X communication with another device and/or UE through the direct communication channel interface 160. Device 122 may also perform cellular V2X communications with another device and/or UE through the radio interface 150. In some embodiments, device 122 is preconfigured to be a subscriber of a particular WTNSP or particular MNO such as the MNO 112. In this embodiment, the device 122 utilizes the licensed band of the device 122's MNO. In some embodiment, the device 122 is preconfigured to be a subscriber of different MNOs or WTNSPs. In this case, the device 122 may use the licensed band(s) of the different radio spectrums that are correspondingly licensed to the device 122's MNOs or WTNSPs.

UE 124 may include or be embodied by a cellular phone, a smart phone, a session initiation protocol (SIP) phone, a laptop, a personal digital assistant (PDA), a satellite radio, a global positioning system, a multimedia device, a video device, a camera, a game console, a tablet, a smart device, a wearable device, or any other similar functioning device. UE 124 may also be referred as a station, a mobile station, a subscriber station or unit, a wireless unit, a mobile device, a wireless device, an access terminal, a handset, a user agent, a mobile client, or some other suitable terminology. In some embodiments, the UE 124 uses the radio interface 150 to establish cellular network communications with another UE 124 and/or device 122. The UE 124 may also use the direct communication channel interface 160 to establish and to perform V2X communication with another UE 124 and/or device 122. In an embodiment, the UE 124 also implements the use of the unlicensed assisted access aggregated band to increase the bandwidth in the direct communication channel interface 160.

Core network 130 may include one or more core network nodes that provide core network services to the devices 122 and UEs 124. Core network 130 may be an evolved packet core (EPC) network or a 5G core network that can facilitate data communications between network connected devices/UEs and the IP services 170. For example, core network 130 can provide one or more communications services (e.g., voice-over-Internet Protocol (VoIP) sessions, push-to-talk (PTT) sessions, group communication sessions, etc.) for devices 122 and/or UEs 124 that connect to the IP services 170 via the core network 130. In this example, the core network 130 may use mobility management entity (MME), serving gateway, packet data network (PDN) gateway, a home subscriber server (HSS), and other core network components to facilitate the communications with the IP services 170. MME may include hardware and/or software modules that can handle signaling related to mobility and security of E-UTRAN access. Serving gateway may deal with a user plane and can transport IP data traffic between the UE/device and the PDN gateway. PDN gateway may provide a point of interconnect between the core network and the IP services 170. HSS may include a database that include user-related and subscriber-related information. HSS may also include functionalities such as mobility management, call and session establishment support, user authentication and access authorization.

Direct communication channel interface 160 may include a direct wireless communication interface such as the PC5 interface that can connect the UEs and devices within a certain signal propagation range (e.g., within 100 meters of each other). Direct communication channel interface 160 may facilitate transmission of voice, data, and other types of content through the use of the shared spectrum or use of the unlicensed assisted access aggregated band in cases where the bandwidth of the shared spectrum is insufficient to support the V2X communication.

IP services 170 may include an Internet, an intranet, an IP Multimedia Subsystem (IMS), and other IP services such as V2X communication services and network operator services. V2X communication services may be implemented by the V2X communication server 172 while the MNO 112 services may be implemented by the MNO services server 174.

The V2X communication server 172 may include general-purpose computers or other electronic devices that are capable of receiving input, processing the input, and generating output data. V2X communication server 172 may provide an integrated messaging and/or control of cellular V2X communications between UEs and devices using the radio interface 150. V2X communication server 172 may be operated by a telecommunications service provider such as the MNO 112. For example, the MNO service server 174, which is associated with the MNO 112, may receive output data from the V2X communication server 172. In this example, the MNO service server 174 may facilitate broadcasting of the received output data to each device and/or UE within the geographical coverage area 180 and through cellular V2X communication. The receiving device/UE may then utilize this information when performing V2X communications through the direct communication interface channel 160.

Example Operation Scenarios

In an example embodiment, the device 122(1) uses a 5.9 GHz unlicensed band as the anchor band to establish the V2X communication over the direct communication channel interface 160(1). The device 122(1) may further monitor the bandwidth requirements of the established V2X communication relative to the bandwidth that can be supported by the use of the 5.9 GHz anchor band. Anchor band such as 5.9 GHz unlicensed band may support a limited channel bandwidth of about 20 MHz. In a case where the bandwidth of the anchor band is less than the bandwidth requirements (e.g., bandwidth requirement of 50 MHz), the device 122(1) may select the one or more licensed bands of the device 122(1)'s network provider for aggregation with the anchor band. The aggregation with the unlicensed anchor band may generate the unlicensed assisted access aggregated band.

In an embodiment, the device 122(1) uses the one or more selected licensed bands (of the unlicensed assisted access aggregated band) as references for the licensed band that can be utilized over the radio interface 150(1). In this embodiment, the device 122(1) adjusts the licensed band that is in use over the radio interface 150(1) to correspond with the selected and aggregated one or more licensed bands over the direct communication channel interface 160(1). For example, the device 122(1) may select a UL channel (1850-1910 MHz) of 1700 MHz B2 band to be aggregated with the 5.9 GHz anchor band. The aggregation between the UL channel of the 1700 MHz B2 band and the anchor band may generate the unlicensed assisted access aggregated band. In this example, and in a case where the 1700 MHz B2 band is in use over the radio interface 150(1), then the device 122(1) may limit the use of the 1700 MHz B2 band over the radio interface 150(1) to the DL channel (i.e., 1930-1990 MHz) since the UL channel was already selected for aggregation with the anchor band. In this regard, the device 122(1) may adjust the licensed band that is in use over the radio interface 150(1) to avoid channel interference with the use of the unlicensed assisted access aggregated band in the direct communication channel interface 160(1). The adjustment of the licensed band that is in use over the radio interface 150(1) may provide the device 122(1) a greater degree of control in managing V2X communications.

In an embodiment, the device 122(1) uses the unlicensed assisted access aggregated band for half or full duplex direct communication over the direct communication channel interface 160. For example, the device 122(1) may aggregate the UL channel (i.e., 1850-1910 MHz) of 1700 MHz B2 band with the 5.9 GHz anchor band to generate the unlicensed assisted access aggregated band. In this example, the device 122(1) may use time division duplexing (TDD) over the transmission bandwidth of the unlicensed assisted access aggregated band to perform the half duplex direct communication over the direct communication channel interface 160(1). In this example still, the device 122(1) may alternately use frequency division duplexing (FDD) over the transmission bandwidth of the unlicensed assisted access aggregated band to perform full duplex direct communication over the direct communication channel interface 160(1). In example embodiments, the device 122(1) updates the core network 130 of its configuration and capabilities, and particularly, the licensed bands that the device 122(1) uses over the radio interface 160(1) and the direct communication channel interface 160(1). In this regard, the core network 130 may also control (from its end) the selection of the licensed band(s) to be aggregated with the anchor band, the adjustment of the licensed band that the device 122(1) uses over the radio interface 160(1), scheduling of transmissions, and the like.

In an example embodiment, the device 122(1) is a subscriber of different MNOs or WTNSPs that own different corresponding radio spectrums. In this embodiment, the device 122(1) selects the one or more licensed bands from the radio spectrums that are correspondingly licensed to the device 122(1)'s network providers. The selected one or more licensed bands may then be aggregated with the anchor band to generate the unlicensed assisted access aggregated band. For example, the device 122(1) is a subscriber of MNO 112(1) and MNO 112(2) that respectively owns different radio spectrum licenses. In this example, the device 122(1) may select at least one licensed band from the MNO 112(1) and MNO 112(2)'s radio spectrums for aggregation with the anchor band.

In the one or more embodiments described above, the aggregated licensed band(s) in the unlicensed assisted access aggregated band over the direct communication channel interface 160 are different from the one or more licensed bands that are in the radio interface 150 in order to avoid channel overlapping or interference as further described below.

Figure 2:
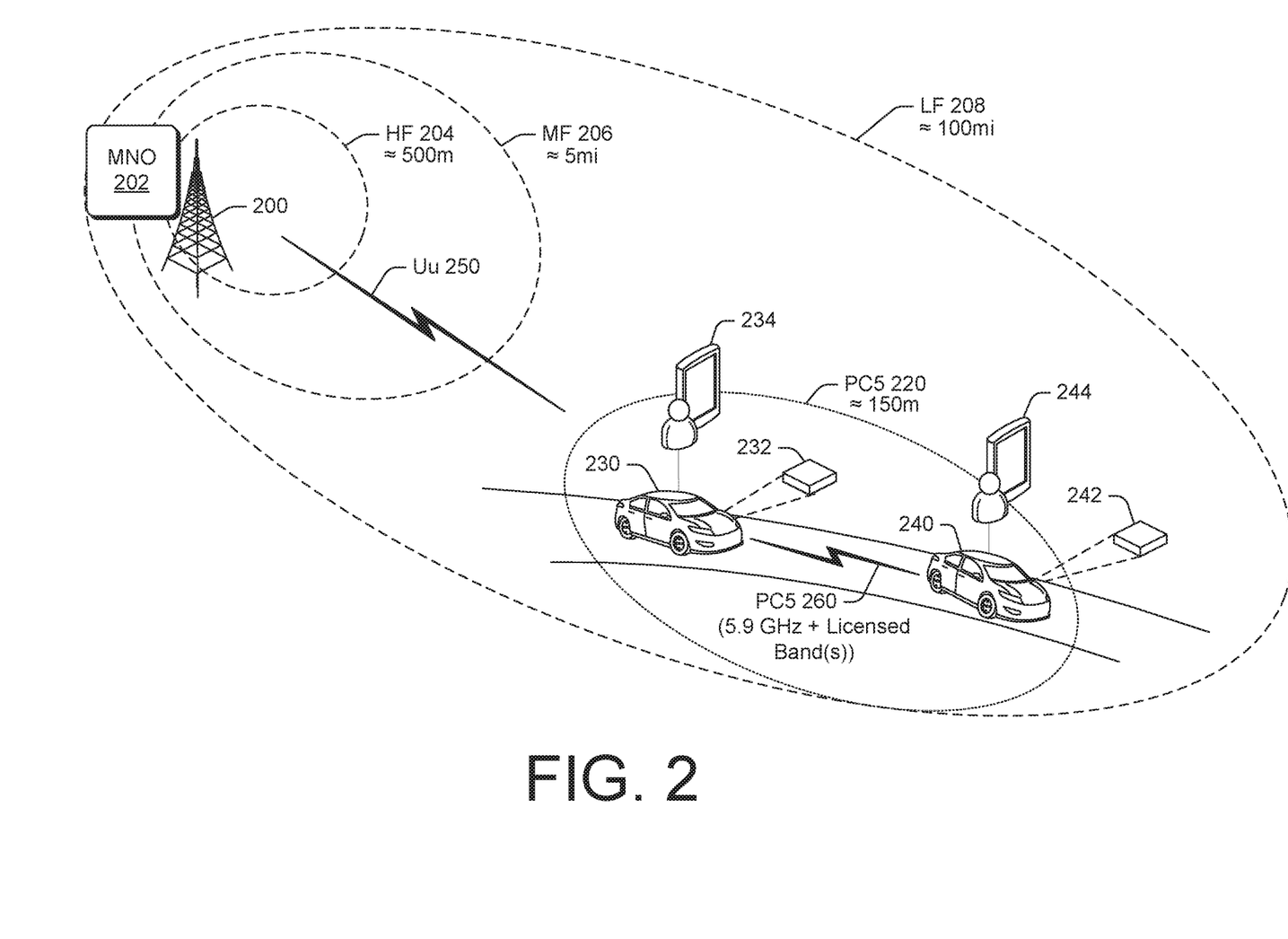
FIG. 2 is a block diagram showing direct communications between wireless communication devices and/or User Equipments (UEs) in a particular geographic coverage area of a cell network.

FIG. 2 is a block diagram showing direct communications between devices and UEs in a particular zone of the geographic coverage area. The block diagram includes a base station 200 associated with MNO 202, a high frequency (HF) coverage area 204, a mid-frequency (MF) coverage area 206, a low frequency (LF) coverage area 208, and a PC5 coverage area 220. The block diagram also includes a first vehicle 230 including a first device 232 and a first UE 234, and a second vehicle 240 including a second device 242 and a second UE 244. The UEs (first UE 234 and second UE 244) and devices (first device 232 and second device 242) may connect to the base station 200 through a Uu 250 and/or can establish direct wireless communication with one another through a PC5 interface 260. In some embodiment, the PC5 interface 260 requires higher data throughput to support the direct wireless communication between the UEs and/or devices. In this regard, the PC5 interface 260 may use the unlicensed assisted access aggregated band in the PC5 interface 260 to support the bandwidth requirement of the direct wireless communication.

Base station 200 may use different radio frequencies in the Uu 250, different amounts of transmitting power, antenna configurations, and the like, to generate the HF coverage area 204, MF coverage area 206, and the LF coverage area 208. The use of high radio frequencies may reach a shorter distance due to a shorter wavelength while utilizing low radio frequencies can cover a longer range due to longer wavelength. In an example embodiment, the base station 200 is configured to detect locations of the UEs/devices relative to each of the HF, MF, or LF coverage area. In this embodiment, the base station 200 relays the detected locations to the UEs/devices through the Uu 250.

HF coverage area 204 may include a signal propagation range or zone within a network cell (e.g., geographic coverage area 180) that can be generated by the use of HF licensed band in the Uu 250. HF coverage area 204 may include a shorter signal propagation range and can support higher channel bandwidth. For example, the base station 200 may utilize a n257 band (28 GHz) over the Uu 250. The n257 band includes the licensed band that can support different channel bandwidths such as 50 MHz, 100 MHz, 200 MHz, and 400 MHz. In this example, the use of the n257 band over the Uu 250 may provide higher amount of channel bandwidth although the HF coverage area 204 and may have a limited signal propagation range of about 500 meters (m) from the base station 200. Different other high frequencies of different MNOs or WTNSPs may be used over the Uu 250 to generate the HF coverage area 204.

MF coverage area 206 may include another signal propagation range or zone within the network cell that can be generated by the use of a MF licensed band in the Uu 250.

MF coverage area 206 may partially overlap with the HF coverage area 204. The MF coverage area 206 may include a longer signal propagation range as compared to the HF coverage area 204 and can support a different amount of channel bandwidths. For example, the base station 200 may utilize a n78 band (3.5 GHz) in the Uu 250 to generate the signal propagation range of about 5 miles along a signal propagation direction of the HF coverage area 204. The n78 band may include the licensed band that can support different channel bandwidths such as a 20 MHz, 50 MHz, 60 MHz, 80, MHz, 90 MHz, and 100 MHz. In this example, the use of the n78 band (3.5 GHz) over the Uu 250 may similarly support a higher amount of channel bandwidth although the signal propagation range may be limited to a few miles from the base station 200. Different other mid frequencies of different MNOs or WTNSPs may be used over the Uu 250 to generate the MF coverage area 206.

LF coverage area 208 may include another signal propagation range or zone within the network cell that can be that can be generated by the use of LF licensed band in the Uu 250. The LF coverage area 208 may partially overlap with the HF coverage area 204 and the MF coverage area 206. The LF coverage area 208 may include a wider and longer signal propagation range, and the use of the LF licensed band can support lesser amounts of bandwidth. For example, the base station 200 may utilize a B12 band (700 MHz) in the Uu 250 to generate a signal propagation range of about 100 miles from the base station 200. The B12 band may include one of the MNO 202's licensed bands that can support channel bandwidths such as a 5 MHz, 10 MHz, and 15 MHz. In this example, the use of the B12 band over the Uu 250 may support a limited amount of channel bandwidth although the signal propagation range may extend up to a hundred miles from the base station 200. Different other low frequencies of different MNOs or WTNSPs may be used over the Uu 250 to generate the LF coverage area 208.

PC5 coverage area 220 may include a direct communication zone or signal propagation range that can be generated by the use of the default shared spectrum (anchor band) or the use of the unlicensed assisted aggregated band in the PC5 interface 260. The use of the default shared spectrum may generate a different signal propagation range as compared to the use of the unlicensed assisted aggregated band. For example, PC5 coverage area 220 may extend to about 150 meters from the transmitting device/UE when the 5.9 GHz unlicensed band is used in the PC5 interface 260. On the other hand, PC5 coverage area 220 may extend to more than 300 meters from the transmitting device/UE when the selected HF licensed band (e.g., 28 GHz) is used in the PC5 interface 260. In an example embodiment, the use of the selected licensed band in the PC5 interface 260 is based upon the location of the device/UE within the coverage areas of the base station 200. Example Operation Scenarios In an example embodiment, the first device 232 selects one or more licensed bands to be aggregated with the anchor band based upon the current locations of the second device 242 and/or UEs 234/244. In this embodiment, the first device 232 utilizes the selected one or more licensed bands as reference licensed bands for adjusting the licensed band that will be used in the Uu 250. For example, the first device 232 and the second device 242 that are communicating through the direct communication channel may be located within the LF coverage area 208 but outside of the HF coverage area 204. In this example, the first device 232 may aggregate the 28 GHz HF band with the 5.9 GHz unlicensed band to generate the unlicensed assisted access aggregated band and without interfering with the use of the same 28 GHz HF band over the HF coverage area 204. In this example still, the selection of the UL channel of the LF licensed band for aggregation to generate the unlicensed assisted access aggregated band may not interfere with the use of the DL channel of the same LF licensed band over the Uu 250.

In an example embodiment, the first device 232 sends its location and capability to the core network (e.g., core network 130). In this case, the core network 130 through the base station 200 may perform the selection of the one or more licensed bands to be aggregated with the first device 232's anchor band to generate the unlicensed assisted access aggregated band. The core network 130 may further perform the selection of the licensed band, scheduling, and timing configurations that can be used by the first device 232 for cellular network communication. In this embodiment, the base station 200 may use the Uu 250 to send the selected licensed bands, scheduling, and timing configurations to the first device 232. For example, the first vehicle 230 and the second vehicle 240 are located within the LF coverage area 208 (but outside of the MF coverage area 206) and are within the PC5 coverage area 220. In this example, the embedded first device 232 may send its detected location and capability to the core network 130 through the base station 200. The core network 130 may then send a reply including the one or more licensed bands that can be aggregated with the anchor band, scheduling of transmissions, and timing configurations. The core network 130 can further select the licensed band that may be used by the first device 232 for cellular network communication over the network interface—Uu 250.

Figure 3:
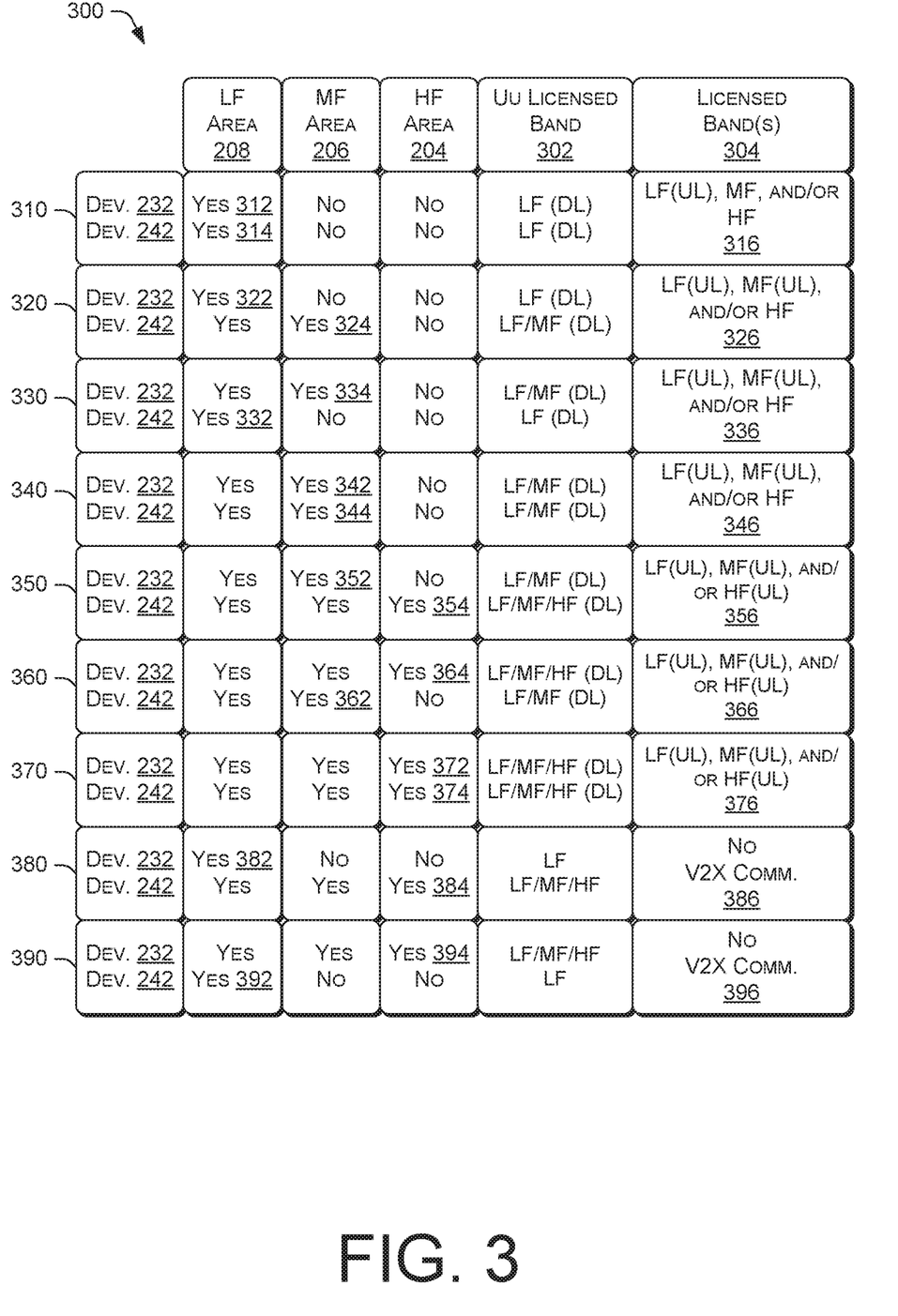
FIG. 3 is a block diagram showing a look-up table (LUT) that includes at least one licensed band for aggregation with an anchor band to generate an unlicensed assisted access aggregated band.

FIG. 3 is a block diagram showing a LUT 300 that the device can use to select the one or more licensed bands to be aggregated with the anchor band for the V2X communication. Row sections of the LUT 300 show location scenarios 310-390 including example actual locations of the first device 232 and the second device 242 over the different coverage areas in each location scenario. Column sections of the LUT 300 show the LF coverage area 208, MF coverage area 206, and the HF coverage area 204 as possible actual locations of the first device 232 and the second device 242 for each location scenario. Column sections of the LUT 300 further show "Uu licensed band 302," which includes the licensed band that is in use at the Uu, and "licensed band(s) 304" that includes the recommended licensed band(s) that can be selected for aggregation with the anchor band. In an example embodiment, the "licensed band(s) 304" column section, which includes at least one licensed band that can be aggregated with the anchor band, includes the licensed band selections that are different from the licensed band under the "Uu licensed band 302" column section. The difference in the licensed bands may be implemented to avoid channel overlapping or channel interferences between the direct communication channel interface and the network interface. LUT 300 may include a simplified reference table for illustration purposes and multiple other LUTs such as, LUTs for heterogenous networks may be utilized in a similar manner as described in embodiments herein.

Location scenario 310 includes an example scenario where the first device 232 and the second device 242 are currently located within the LF coverage area 208 as shown by "Yes 312" and "Yes 314," respectively, under the "LF coverage area 208" column section. That is, the first device 232 and the second device 242 are currently located outside of the MF coverage area 206 and the HF coverage area 204. "Yes 312" and "Yes 314" correspond to the actual locations of the first device 232 and the second device 242, respectively, for the example location scenario 310. In this example scenario, the "licensed band(s) 304" column section correspondingly indicates the one or more licensed band(s) that can be selected for one-way, two-way, or three-way aggregation with the anchor band. In an example embodiment, and for the location scenario 310, the HF licensed band, MF licensed band, and/or the UL channel of the LF licensed band as shown by "LF(UL), HF, and/or MF 316" are the licensed band(s) that are used for one-way, two-way, or three-way aggregation with the anchor band. In this embodiment, at least one of the HF licensed band, MF licensed band, and the UL channel of the LF licensed band can be aggregated. Further, and for the location scenario 310, the DL channel of the LF licensed band can be selected for aggregation with the anchor band when the UL channel of the same LF licensed band is used in the Uu licensed band 302 (not shown).

For location scenario 310, and in a case where the MF licensed band and the HF licensed band under "licensed band(s) 304" column section are selected for aggregation with the anchor band, then the first device 232 may use the UL and DL channels of the LF licensed band over the Uu 250 without causing channel interference with the selected MF and HF licensed bands. In another example, and in a case where the UL channel of the LF licensed band under licensed band(s) 304 is selected for aggregation with the anchor band, then the first device 232 may limit the use of LF licensed band over the Uu 250 to include the DL channel in order to avoid channel interference. Similarly, and in a case where the DL channel (not shown) of the LF licensed band under licensed band(s) 304 is selected for aggregation with the anchor band, then the first device 232 may limit the use of LF licensed band over the Uu 250 to include the UL channel in order to avoid channel interference.

Location scenarios 320-340 include example scenarios where the device (e.g., first device 232) may select the HF licensed band, UL channel of the LF licensed band, UL channel of the MF licensed band, or a combination thereof, for aggregation with the anchor band. In an example embodiment, the first device 232 uses the selection of the one or more licensed bands as references for the licensed band that is utilized over the Uu 250. For example, and for location scenario 320, the first device is 232 is located within the LF coverage area 208 and outside of the MF coverage area 206/HF coverage area 204 as shown by "Yes 322," while the second device 242 is located within overlapping areas between the LF coverage area 208 and the MF coverage area 206 as shown by "Yes 324." In this example, the first device 232 may select the HF licensed band of recommended "LF(UL), MF(UL), and/or HF 326" for aggregation with the anchor band. With the selected HF licensed band for aggregation, the first device 232 may utilize the LF and MF licensed bands over the Uu 250 without interfering with the selected HF licensed band that is in use over the PC5 interface 260. In another example, the first device 232 may select the HF licensed band and in addition, selects the UL channel of the LF licensed band of the recommended "LF(UL), MF(UL), and/or HF 326" for aggregation with the anchor band. In this case, the first device 232 may utilize the MF licensed band or the DL channel of the LF licensed band over the Uu 250 without interfering with the selected HF and LF (UL) licensed bands that were aggregated with the anchor band.

Location scenarios 350-370 include example scenarios where the device (e.g., first device 232) may select the UL channels of the HF, MF, and/or LF licensed bands for aggregation with the anchor band. In an example embodiment, the first device 232 uses the selection of the one or more licensed bands from "LF(UL), MF(UL), and/or HF(UL) 356" as references for the selection of the licensed band to be utilized over the Uu 250. For example and for location scenario 350, the first device is 232 is located within overlapping areas between the LF coverage area 208 and the MF coverage area 206 as shown by "Yes 352," while the second device 242 is located within overlapping areas between the LF, MF, and HF coverage areas as shown by "Yes 354." In this example, the first device 232 may select the UL channels of the HF, MF, and LF licensed bands (LF(UL), MF(UL), and/or HF(UL) 356) for aggregation with the anchor band. Based on these selections, the first device 232 may select the DL channels of the HF, MF, and/or LF licensed bands over the Uu 250 without creating channel interferences with the selected licensed bands that were aggregated with the anchor band. In other embodiments, the first device 232 selects the DL channels of the HF, MF, and LF licensed bands for aggregation with the anchor band. Based on these selections, the first device 232 may select the UL channels of the HF, MF, and/or LF licensed bands over the Uu 250 without creating channel interferences with the selected licensed bands that were aggregated with the anchor band.

Location scenarios 380-390 include example scenarios where the device locations prevent establishment of the V2X communication in the direct communication channel interface. For example and for location scenario 380, the first device is 232 is located within the LF coverage area 208 and outside of the MF/HF coverage areas as shown by "Yes 382," while the second device 242 is located within overlapping areas between the LF/MF/HF coverage areas as shown by "Yes 384." In this example, the distance between the first device 232 and the second device 242 may include tens of miles, and in this regard, the device locations are beyond the signal propagation range for the direct communication (e.g., PC5 coverage area 220).

In an example embodiment, the LUT 300 includes licensed band selections that are specific to a particular MNO or WTNSP. For a different MNO or WTNSP that owns a different radio spectrum license, the licensed band(s) 304 column section of the LUT 300 may include different values of licensed band selections.

Example Device Components

Figure 4:
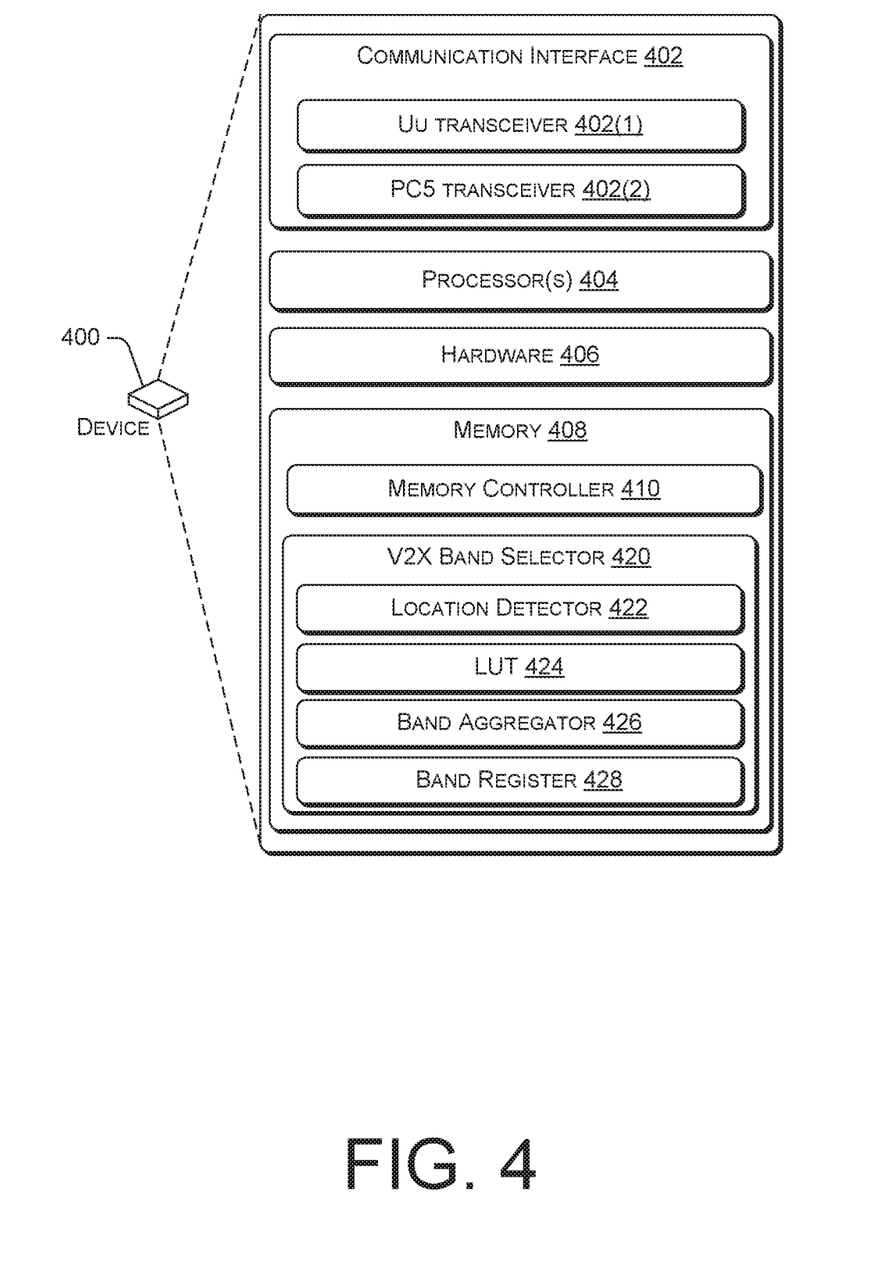
FIG. 4 is a block diagram showing various components of an illustrative device that uses the unlicensed assisted access aggregated band to improve bandwidth reliability in a direct communication channel.

FIG. 4 is a block diagram showing various components of an illustrative device 400 that may be installed in a vehicle for V2X communication. It is noted that the device 400 as described herein can operate with more or fewer of the components shown herein. Additionally, the device 400 shown herein or portions thereof can serve as a representation of one or more of the devices 400 of the present system.

Device 400 may include a communication interface 402, one or more processors 404, hardware 406, and memory 408. The memory 408 may further include a memory controller 410 and a V2X band selector 420 including a location detector 422, a LUT 424, a band aggregator 426, and a band register 428.

Communication interface 402 may include a hardware circuit that transmits and/or receives data from another device, UE, or base station. Communication interface 402 may include a Uu transceiver 402(1) and a PC5 transceiver 402(2) that facilitate wireless communications through the Uu 250 and PC5 interface 260, respectively. Each of the Uu transceiver 402(1) and the PC5 transceiver 402(2) may include corresponding hardware circuit components such as amplifiers, filters, equalizers, etc. that can be used to process data and/or transmit/receive data. For example, the Uu transceiver 402(1) includes hardware circuit components that facilitate cellular network communications between the device 400 and the base station 200. Similarly, the PC5 transceiver 402(2) may include separate hardware circuit components that facilitate direct communications or V2X communication between the device 400 and another device and/or UE through the PC5 interface 260. In this example, the Uu transceiver 402(1) may operate independently of the PC5 transceiver 402(2).

Processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 404 may also be responsible for executing all computer applications stored in the memory, which can be associated with common types of volatile (RAM) and/or non-volatile (ROM) memory. The hardware 406 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 408 may be implemented using computer-readable media, such as computer-readable storage media. Computer-readable media includes, at least, two types of computer-readable media, namely computer-readable storage media and communications media. Computer storage media includes volatile and nonvolatile, removable and non-removable media implemented in any method or technology for storage of information such as computer-readable instructions, data structures, program modules, or other data. Computer storage media includes, but is not limited to, Random Access Memory (RAM), Dynamic Random Access Memory (DRAM), Read Only Memory (ROM), Electrically Erasable Programmable Read Only Memory (EEPROM), flash memory or other memory technology, Compact Disc— Read Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 408 may also include a firewall. In some embodiments, the firewall is implemented as hardware 406 in the device 400.

Memory controller 410 may include a hardware circuit component that enables the memory 408 to interact with the communication interface 402, processors 404, hardware 406, and other components of the device 400. In some embodiments, memory controller 410 facilitates the selection of the one or more licensed bands (e.g., licensed bands 304) that are aggregated with the default shared spectrum. In another embodiment, the memory controller 410 receives a signal from the processors 404 to initiate processing of V2X communication data and to select the at least one licensed band for aggregation based on the processed V2X communication data. The V2X communication data may include parameters such as detected locations of the device 400 relative to signal propagation ranges, detected locations of other devices/UEs that are engaged in V2X communication with the device 400, device's transmitting power, bandwidth requirement of the V2X communication, radio spectrum of device 400's network subscription, and the like. In this other embodiment, the memory controller 410 utilizes the V2X band selector 420 to generate the unlicensed assisted access aggregated band as described herein.

V2X band selector 420 may include a hardware circuit component that selects at least one licensed band for aggregation with the anchor band. V2X band selector 420 may receive control signal from the memory controller 410 and/or processor(s) 404 to perform the selection. In an embodiment, the V2X band selector 420 utilizes the location detector 422 to determine physical location of communicating devices, and then uses the LUT 424 in selecting the corresponding one or more licensed bands for one-way, two-way, or three-way aggregation with the anchor band. Upon selection of the one or more licensed bands, the band aggregator 426 may aggregate the selected one or more licensed bands with the anchor band to generate the unlicensed assisted access aggregated band. In some embodiments or scenarios, the processor(s) 404 or the memory 408 uses the selected one or more licensed bands as references for the selection of the licensed band to be used in the Uu transceiver 402(1). In this embodiment, the Uu transceiver 402(1) is configured to use the selected licensed band that is different from the selected licensed band(s) for aggregation with the anchor band.

Location detector 422 may include a hardware circuit component that detects present position/location and/or projected movements of the device 400 relative to different coverage areas such as the HF/MF/LF coverage areas and PC5 coverage area. In an example embodiment, the location detector 422 uses the different signal propagation ranges of the base station as references for detecting the location of the device 400. For example, the location detector 422 stores the different signal propagation ranges for the LF coverage area 208, MF coverage area 206, and HF coverage area 204. In this example, the location detector 422 may use Global Positioning System (GPS) to detect the location of the device 400 and to correlate the detected location and/or movements to the stored coverage areas. Similarly, the location detector 422 may store direct communication range such as the PC5 coverage area 220. In this case, location detector 422 may correlate the detected locations of communicating UEs/devices relative to the stored direct communication range.

LUT 424 may include a reference table that can be used for the selection of the licensed band(s) to be aggregated with the anchor band. LUT 424 may include licensed band selections (e.g., licensed band(s) 304) that can be specific to radio spectrum of the device's network provider. For a heterogenous network that includes macro cells and small cells, LUT 424 may include different selections of licensed band(s) 304 corresponding to the licensed bands that are in use in the particular macro cell or small cell.

Band register 428 may include a hardware circuit component that stores the anchor band and the unlicensed assisted access aggregated band that can be used in the PC5 transceiver 402(2). In an example embodiment, band register 428 stores or pre-stores the shared spectrum as anchor band for V2X communication. For example, PC5 transceiver 402(2) may use the 5.9 GHz unlicensed band to initially establish V2X communication. In this example, the band register 428 may store or pre-store the 5.9 GHz unlicensed band as the anchor band for the PC5 transceiver 402(2). In a case where one or more selected licensed bands are aggregated with the anchor band, the band register 428 stores the aggregated band (i.e., unlicensed assisted access aggregated band) that is used in the PC5 transceiver 402(2) to support the V2X communication. In other embodiment, the device 400 updates the unlicensed assisted access aggregated band in the band register 428 to correspond with changes in the V2X communication data. In this other embodiment, the V2X band selector 420 performs a new licensed band selection that can be aggregated with the anchor band in the band register 428. The new unlicensed assisted access aggregated band may then be stored in the band register 428. Changes in the V2X communication data include changes in detected device locations, change in device network subscription, and the like.

In an embodiment, the PC5 transceiver 402(2) initially uses the stored 5.9 GHz unlicensed band (i.e., anchor band) to establish V2X communication with another device and/or UE. In this embodiment, the processor(s) 404 continuously monitors bandwidth requirements of the V2X communication relative to the bandwidth of the 5.9 GHz anchor band that is in use in the PC5 transceiver 402(2). The monitoring may include comparing the bandwidth requirements of the V2X communication with the bandwidth of the 5.9 GHz anchor band. In a case where the bandwidth of the stored band is lesser than the bandwidth requirement, the processor(s) 404 may request the memory controller 410 to select the one or more licensed bands that can be aggregated with the 5.9 GHz anchor band to generate the unlicensed assisted access aggregated band. With the generated unlicensed assisted access aggregated band, the processor(s) 404 may utilize the selected licensed band(s) as references for selecting the licensed band that can be used in the Uu transceiver 402(1). In this case, the configuration of the Uu transceiver 402(1) may adjust to the selected licensed band(s) that are in use in the PC5 transceiver 402(2).

In an embodiment, the selection of the licensed band(s) for aggregation includes selection of the UL and/or DL channel of the licensed band. That is, the UL channel of the licensed band may be selected independently of the licensed band's DL channel. For example, the device 400 may select 1850-1910 MHz UL channel of the B2 licensed band for aggregation with the anchor band. In this example, the device 400 may use 1930-1990 MHz DL channel of the B2 licensed band in the Uu transceiver 402(1) without creating channel interference with the use of the unlicensed assisted access aggregated band in the PC5 transceiver 402(2).

In an embodiment, the processor(s) 404 or the memory controller 408 prioritizes application of the unlicensed assisted access aggregated band based on the type of V2X communication component to which the shared spectrum bandwidth is allocated. For example, the device 400 allocates a 15 MHz portion and a 5 MHz portion of the 20 MHz-anchor band bandwidth for V2V and V2P communications, respectively. In this example, and after selections of the one or more licensed bands to be aggregated, the processor(s) 400 or memory controller 408 may prioritize the application of the unlicensed assisted access aggregated band for the V2V communication (e.g., platooning or autonomous driving).

In some embodiment, the device 400 sends its device configuration and device capability to the core network 130. In this embodiment, the device 400 and particularly the Uu transceiver 402(1) receives a communication from the core network 130 including the one or more licensed band selections to be aggregated with the anchor band, licensed band selections to be used in the Uu transceiver 402(1), scheduling, and timing configurations. In this regard, the core network 130 through the base station may also perform the selection of the one or more licensed bands to generate the unlicensed assisted access aggregated band for the V2X communication.

Example Process

Figure 5:
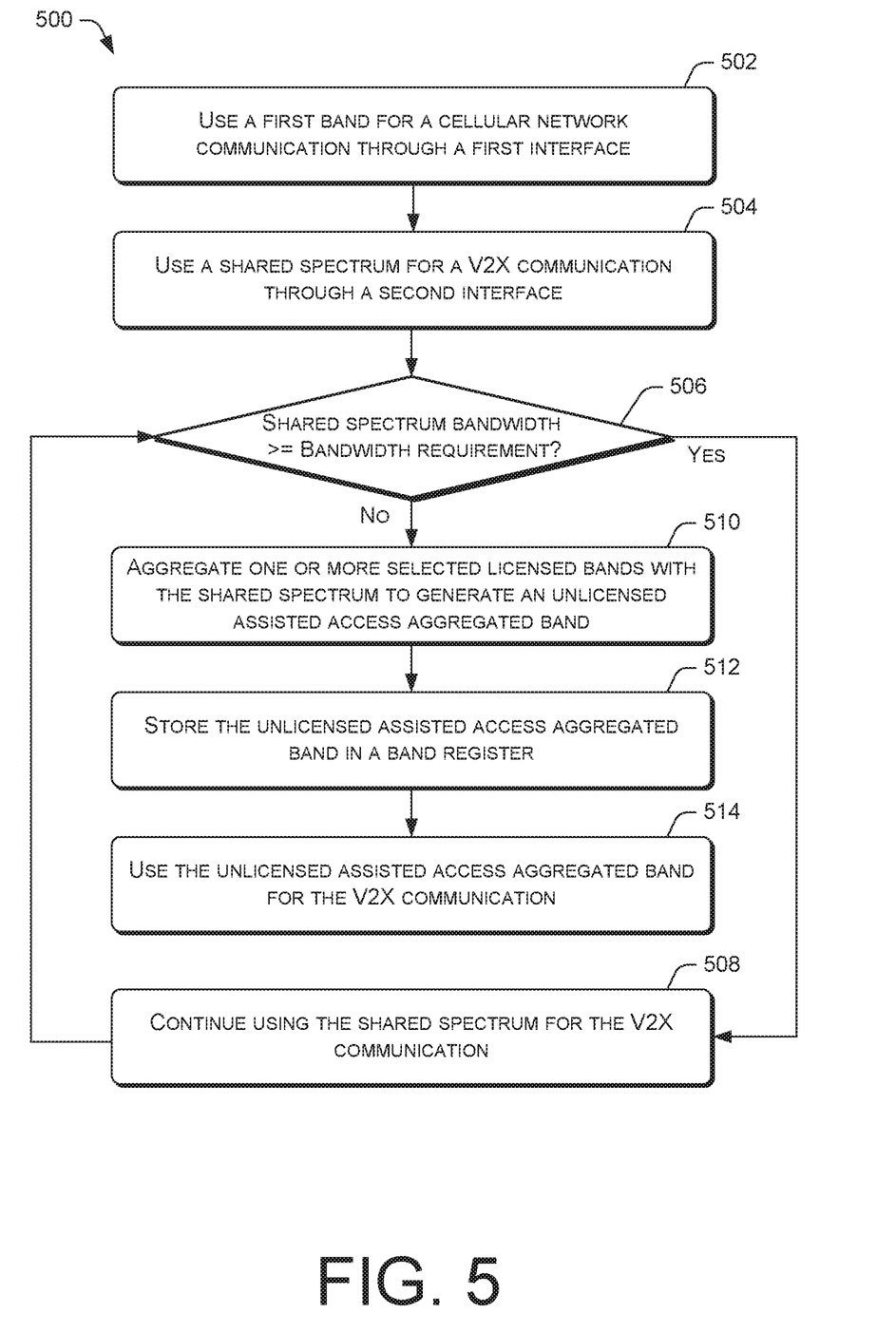
FIG. 5 is a flow diagram of an example process for improving the bandwidth reliability of the direct communication channel.
Figure 6:
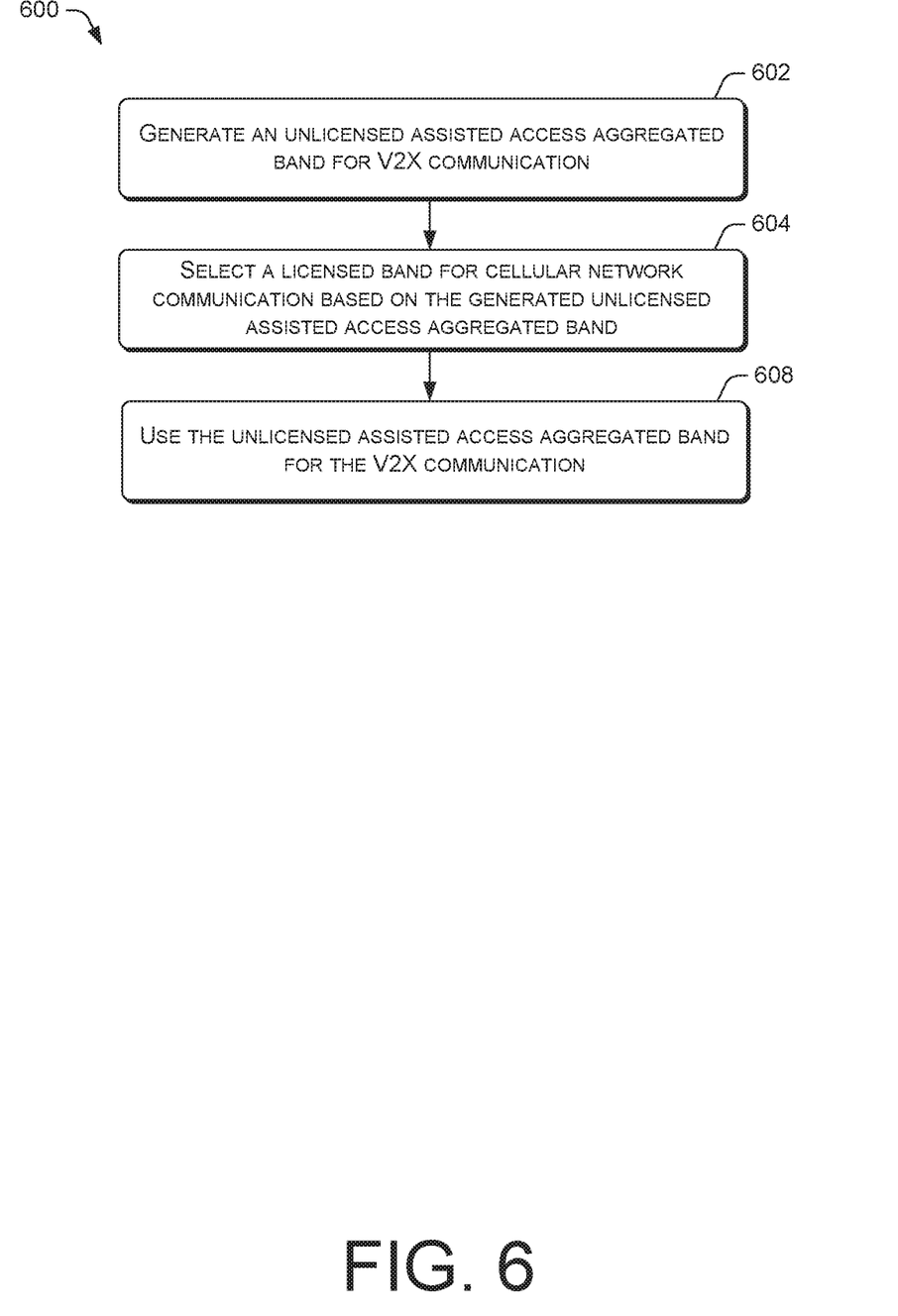
FIG. 6 is a flow diagram of an example process for improving a device's capability to establish the V2X communication.

FIGS. 5-6 presents illustrative processes 500-600 for increasing direct communication channel bandwidth reliability in the direct communication channel through the use of unlicensed assisted access aggregated band. The processes 500-600 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-600 are described with reference to FIGS. 1-4.

FIG. 5 is a flow diagram of an example process 500 for improving bandwidth reliability in the direct communication channel from the perspective of the device. At block 502, using a first band for a cellular network communication through a first interface is performed. For example, the first device 232 may use the LF licensed band in the Uu transceiver 402(1) to establish cellular network communications with the base station 200 over the Uu 250. At block 504, using a shared spectrum anchor band to perform a V2X communication through a second interface is performed. For example, the first device 232 may use the 5.9 GHz anchor band in the PC5 transceiver 402(2) to perform V2X communications with the second device 242, first UE 234, and/or second UE 244. In this example, the band register 428 may store the 5.9 GHz anchor band as the default band for the V2X communication.

At decision block 506, determining whether a bandwidth of the spectrum is at least equal to a bandwidth requirement of the V2X communication. If the bandwidth of the shared spectrum (i.e., default band) is at least equal to the bandwidth requirement ("Yes" at decision block 508), then at block 508, continuing the use of the shared spectrum for the V2X communication is performed. If the bandwidth of the second band is less than the bandwidth requirement ("No" at decision block 506), then at block 510, aggregating one or more selected licensed bands with the shared spectrum is performed to generate the unlicensed assisted access aggregated band. For example, the first device 232 utilizes the LUT 424 to select the one or more licensed bands to be aggregated with the anchor band. At block 512, storing the unlicensed assisted access aggregated band in the band register is performed. For example, the first device 232 stores the unlicensed assisted access aggregated band in the band register 428. At block 516, using the unlicensed assisted access aggregated band for the V2X communication is performed.

In some embodiments, the first device 232's processor continuously monitors the bandwidth requirements of the V2X communication while the unlicensed assisted access aggregated band is in use in the PC5 transceiver 402(2). In a case where the processor determines that the bandwidth of the anchor band is sufficient to support the monitored bandwidth requirements of the V2X communication, then the processor may facilitate shifting of the PC5 transceiver 402(2)'s channel band from the unlicensed assisted access aggregated band to the anchor band.

FIG. 6 is a flow diagram of an example process 600 for improving device's capability to establish V2X communication through the direct communication channel interface. At block 602, generating unlicensed assisted access aggregated band for V2X communication over a direct communication channel is performed. For example, the first device 232 aggregates the selected UL channel of the LF licensed band with the anchor band to generate the unlicensed assisted access aggregated band. In this example, the unlicensed assisted access aggregated band may be used in the PC5 transceiver 402(2) for V2X communication. At block 604, selecting a licensed band for cellular network communication based on the generated unlicensed assisted access aggregated band is performed. For example, the first device 232 selects the DL channel of the LF licensed band to be used in the Uu transceiver 402(1) based from the selection of the UL channel of the same LF licensed band for aggregation with the anchor band. In this example, the first device 232 may use the selected DL channel of the LF licensed band in the Uu transceiver 402(1) to avoid channel interference with the UL channel of the same licensed band in PC5 transceiver 402(2).

At block 606, using the generated unlicensed assisted access aggregated band for the V2X communication is performed. In some embodiment, the device adjusts the configuration and capability of its hardware circuit components based on the conditions and parameters that may be generated by the use of the unlicensed assisted access aggregated band. For example, the use of the unlicensed assisted access aggregated band in the PC5 transceiver 402(2) may consume high transmission power. In this example, the device may adjust the power consumption of the other hardware circuit components to adapt the use of the unlicensed assisted access aggregated band in the PC5 transceiver 402(2).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media storing computer-executable instructions that upon execution cause one or more processors to perform acts comprising:
   using a first licensed band to perform a wireless communication through a first interface;
   using a shared spectrum for a vehicle-to-everything (V2X) communication through a direct communication channel interface; and
   comparing a bandwidth requirement of the V2X communication with a bandwidth of the shared spectrum, wherein in response to the bandwidth that is less than the bandwidth requirement:
   selecting at least one second licensed band;
   aggregating the selected at least one second licensed band with the shared spectrum to generate an unlicensed assisted access aggregated band; and
   using the unlicensed assisted access aggregated band in the direct communication channel interface, wherein the aggregated least one second licensed band is different from the first licensed band.

2. The one or more computer-readable storage media of claim 1, wherein the first interface includes a Long Term Evolution interface (Uu).

3. The one or more computer-readable storage media of claim 1, wherein the direct communication channel interface includes a Long Term Evolution V2X interface (PC5 interface).

4. The one or more computer-readable storage media of claim 1, wherein the shared spectrum includes a 5.9 GHz unlicensed band.

5. The one or more computer-readable storage media of claim 1 further comprising: adjusting the first licensed band based on the selected at least one second licensed band.

6. The one or more computer-readable storage media of claim 1, wherein the selecting further comprises:
   identifying a location of a device; and
   using a look up table (LUT) for the selecting of the at least one second licensed band that corresponds to the identified location of the device.

7. The one or more computer-readable storage media of claim 1, wherein the at least one second licensed band includes a licensed band of a radio spectrum that is licensed to a particular mobile network operator to which a device is a subscriber.

8. The one or more computer-readable storage media of claim 7, wherein the device is preconfigured to be a subscriber of the particular mobile network operator during a vehicle manufacture.

9. The one or more computer-readable storage media of claim 1, wherein the selecting of the at least one second licensed band includes selecting an uplink channel of the at least one second licensed band.

10. A device, comprising:
    a communication interface that uses a first licensed band to perform a cellular network communication through a first interface, and uses an anchor band to perform a vehicle-to-everything (V2X) communication through a second interface;
    a processor that is in communication with the communication interface, wherein the processor compares a bandwidth requirement of the V2X communication with a bandwidth of the anchor band; and
    a V2X band selector that is in communication with the processor and the communication interface, wherein in response to the bandwidth that is less than the bandwidth requirement, the V2X band selector selects at least one second licensed band that is aggregated with the anchor band to generate an unlicensed assisted access aggregated band, wherein the selected at least one second licensed band is different from the first licensed band.

11. The device of claim 10, wherein the first interface includes a Long Term Evolution interface (Uu).

12. The device of claim 10, wherein the second interface includes a Long Term Evolution V2X interface (PC5 interface).

13. The device of claim 10, wherein the unlicensed assisted access aggregated band includes a bandwidth that is at least equal to the bandwidth requirement of the V2X communication.

14. The device of claim 10, wherein the anchor band includes a 5.9 GHz unlicensed band.

15. The device of claim 10, wherein the processor adjusts the first licensed band in the first interface based on the selected at least one second licensed band.

16. The device of claim 10 further comprising:
a location detector that identifies a location of the device;
a look up table (LUT) that includes a reference table for the selection of the at least one second licensed band that corresponds to the identified location of the device.

17. The device of claim 10, wherein the selected at least one second licensed band includes a radio spectrum that is licensed to a device's mobile network operator provider.

18. A computer-implemented method, comprising:
using, by a device, a first licensed band to perform a wireless communication through a first interface;
using, by the device, a shared spectrum to perform a vehicle-to-everything (V2X) communication through a second interface; and
comparing a bandwidth requirement of the V2X communication with a bandwidth of the shared spectrum, wherein in response to the bandwidth that is less than the bandwidth requirement:
using a look-up table (LUT) to select at least one second licensed band;
aggregating the selected at least one second licensed band with the shared spectrum to generate an unlicensed assisted access aggregated band; and
using the unlicensed assisted access aggregated band in the second interface, wherein the selected at least one second licensed band is different from the first licensed band.

19. The computer-implemented method of claim 18, wherein the first interface includes a Long Term Evolution interface (Uu).

20. The computer-implemented method of claim 18, wherein the second interface includes a Long Term Evolution V2X interface (PC5 interface).

* * * * *